US006617005B2

(12) United States Patent
Duffney

(10) Patent No.: US 6,617,005 B2
(45) Date of Patent: Sep. 9, 2003

(54) DECORATIVE MOLDING/CASING

(76) Inventor: Timothy Duffney, Rte. 2, Box 667, Aitkin, MN (US) 56431

( * ) Notice: Subject to any disclaimer, the term of this patent is extended or adjusted under 35 U.S.C. 154(b) by 0 days.

(21) Appl. No.: 10/099,203

(22) Filed: Mar. 12, 2002

(65) Prior Publication Data

US 2002/0172801 A1 Nov. 21, 2002

Related U.S. Application Data

(62) Division of application No. 09/372,692, filed on Aug. 11, 1999, now Pat. No. 6,409,870.

(60) Provisional application No. 60/117,403, filed on Jan. 27, 1999.

(51) Int. Cl.[7] .................................................. B32B 3/24

(52) U.S. Cl. ........................... 428/138; 428/13; 428/14; 428/139; 428/67; 40/798; 40/799

(58) Field of Search ............................ 428/13, 14, 139, 428/138, 67; 40/798, 799

(56) References Cited

U.S. PATENT DOCUMENTS 337,033 A * 3/1886 Thonssen ..................... 40/799
457,478 A * 8/1891 Koskul ........................ 40/798
480,953 A * 8/1892 Mauerhofer ................. 40/732
1,628,640 A * 5/1927 Baldwin ...................... 40/798
1,802,170 A * 4/1931 Colbert et al. ................ 40/737
2,161,549 A * 6/1939 Most .......................... 264/273
4,180,934 A * 1/1980 Cohen ......................... 40/580
5,239,800 A * 8/1993 Edwards et al. ............ 312/111
6,108,958 A * 8/2000 Kofoed ........................ 40/737
6,131,345 A * 10/2000 Pelusio .......................... 428/3

OTHER PUBLICATIONS

U.S. patent application Ser. No. 09/372.692, Timothy Duffney, filed Aug. 11, 1999.

U.S. patent application Ser. No. 60/117,403, Timothy Duffney, filed Jan. 27, 1999.

* cited by examiner

*Primary Examiner*—William P. Watkins, III
(74) *Attorney, Agent, or Firm*—Vidas, Arrett & Steinkraus, PA

(57) ABSTRACT

A decorative molding/casing for use in decorating a room or furniture as disclosed. The decorative molding/casing in general has a routed or lazered front surface establishing a front face section. The rear surface of the molding/casing is preferably milled to create a longitudinal groove which establishes a first interior surface and a pair of symmetric support sections. Any desired artistic design cutouts may then be routed or lazered through the front face section and through the first interior surface into the longitudinal groove. A filler material is then colored or selected. The filler material may then be positioned within the longitudinal groove between the pair of symmetric support sections. The colored surface of the filler material may then be positioned proximate to the first interior surface where the filler material may be secured to the first interior surface by any preferred means as desired by an individual. The colored surface of the filler material then functions as an accent for the decorative molding/casing which may be used as a border or other decorative accent feature within a room or upon furniture or picture frames.

16 Claims, 5 Drawing Sheets

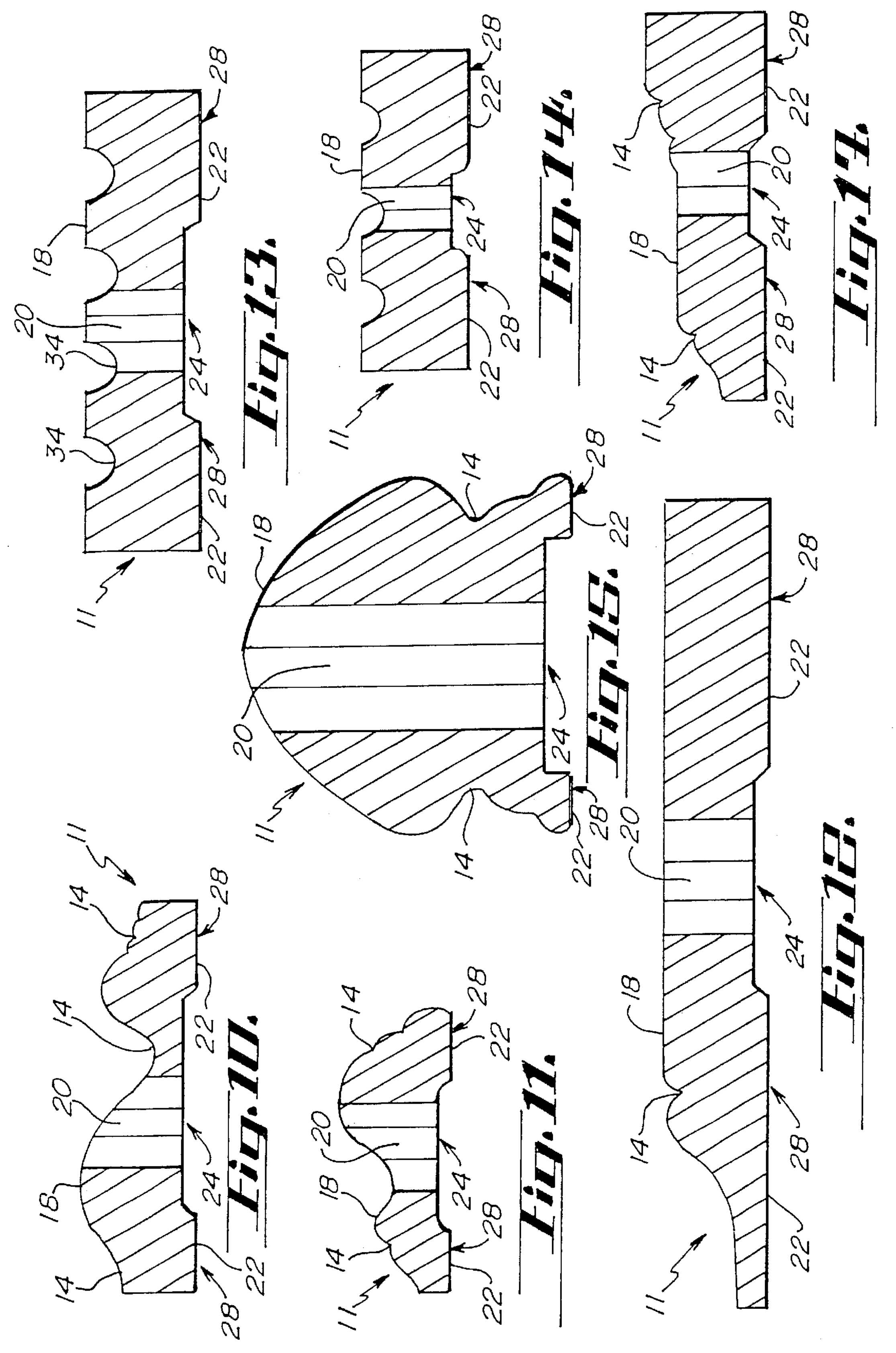

DECORATIVE MOLDING/CASING

This is application is a divisional application and is based upon and claims priority to U.S. Utility application Ser. No. 09/372,692 filed Aug. 11, 1999, now U.S. Pat. No. 6,409,870, which claims priority to Provisional Patent Application Serial No. 60/117,403 filed Jan. 27, 1999, entitled "DECORATIVE MOLDING/CASING" the entire contents of which are incorporated herein by reference.

BACKGROUND OF THE INVENTION

In the past, room or wall accents have generally been limited to paint, wallpaper, borders, colored tile, and/or routing of wood, plastic, or metal surfaces.

It has not been known to provide a room or wall accent having three-dimensional structure. In addition, it has not been known or attempted to use a filler material having a colored surface, which is visible through a molding or casing, as a decorative artistic feature within borders, window or door frames, or as accents upon a wall or furniture items. Further, in the past, it has not been known to utilize a molding and/or casing having a routed or lazered front surface to establish a front face section, and then milling the rear surface to create a longitudinal groove having a first interior surface and a relatively large width dimension. Further, it has not been known to route or lazer artistic designs completely through the front face section and positioning of a colored filler backing material within the longitudinal groove to highlight the artistic designs of the routed or lazered molding or casing for use within a room, upon a wall, as a door frame, a window frame, and/or upon furniture as an artistic accent.

SUMMARY OF THE INVENTION

It is a principal object of the present invention to provide a molding/casing which may be used as an artistic border within a room, as a door frame, as a window frame, or upon furniture.

It is still another principal object of the present invention to provide an artistic molding/casing of relatively simple and inexpensive design, construction, and operation which may be used as an artistic accent feature within a room or upon furniture without fear of injury to persons and/or damage to property.

It is still another principal object of the present invention to provide an artistic molding/casing which is flexible enabling an individual to select any design shape for routed or lazered cutouts.

It is still another principal object of the present invention to provide an artistic molding/casing which is flexible enabling an individual to select any desired color or color combination for a backing accent strip.

It is still another principal object of the present invention to provide for a decorative molding/casing which may be utilized as full, half, or one-quarter rounds in conjunction with windows and/or door frames.

It is still another principal object of the present invention to provide a decorative molding/casing which may be used as an artistic accent upon furniture items such as bunk beds and/or picture frames.

It is still another principal object of the present invention to provide a decorative molding/casing which may have applications for either interior or exterior use.

It is still another principal object of the present invention to provide a decorative molding/casing having a backing strip which may include any desired color to complement wallpaper, paint, ceiling color, floor color, carpet, and/or tile.

It is still another principal object of the present invention to provide a decorative molding/casing which functions to create an artistic atmosphere through stock design.

It is still another principal object of the present invention to use a decorative molding/casing in window treatment applications in substitution for valances to hide window shades.

It is still another principal object of the present invention to provide a decorative molding/casing which may be used as fireplace surrounds, stair components, millwork, door surrounds, picture framing, wallboards, mirrors, and/or poster boards.

It is still another principal object of the present invention to provide a decorative molding/casing having any desired shape of cutouts.

A feature of the present invention is the provision of a decorative molding/casing having an exterior surface having routed or lazered edges.

Another feature of the present invention is the provision of a decorative molding/casing having an exterior surface defining a front face section.

Still another feature of the present invention is a decorative molding/casing having a milled rear surface defining a longitudinal groove creating a first interior surface.

Still another feature of the present invention is the provision of a decorative molding/casing having artistic routed or lazered designs passing through the front face section creating a plurality of repetitive or non-repetitive cutouts.

Still another feature of the present invention is the provision of a decorative molding/casing having a milled longitudinal groove establishing a pair of symmetric support sections.

Still another feature of the present invention is the provision of a decorative molding/casing having a filler material having a colored surface which is preferably positioned within the longitudinal groove where the colored surface is positioned proximate to the first interior surface and is visible through the cutouts.

Still another feature of the present invention is the provision of a decorative molding/casing where the colored surface of the filler material functions as an accent for the exposed artistic cutout designs routed or lazered through the front face section.

Still another feature of the present invention is the provision of a decorative molding/casing which may be formed of plastic, metal, wood, tile, brass, aluminum, copper, Corian, Fountainhead, Surrell, and/or Avonite material as preferred by an individual.

Still another feature of the present invention is the provision of a decorative molding/casing where the filler material may be formed of plywood, pressed wood, filler board, plastic, metal, and/or tile as preferred by an individual.

Still another feature of the present invention is the provision of a decorative molding/casing which may have any dimensions as preferred by an individual to provide artistic accents within a room or on furniture items.

BRIEF DESCRIPTION OF THE DRAWINGS

FIG. 10 is an alternative detail partial cross-sectional side view of the Decorative Molding/Casing taken along the line 3—3 of FIG. 2.

FIG. 11 is an alternative detail partial cross-sectional side view of the Decorative Molding/Casing taken along the line 3—3 of FIG. 2.

FIG. 12 is an alternative detail partial cross-sectional side view of the Decorative Molding/Casing taken along the line 3—3 of FIG. 2.

FIG. 13 is an alternative detail partial cross-sectional side view of the Decorative Molding/Casing taken along the line 3—3 of FIG. 2.

FIG. 14 is an alternative detail partial cross-sectional side view of the Decorative Molding/Casing taken along the line 3—3 of FIG. 2.

FIG. 15 is an alternative detail partial cross-sectional side view of the Decorative Molding/Casing taken along the line 3—3 of FIG. 2.

FIG. 17 is an alternative detail partial cross-sectional side view of the Decorative Molding/Casing taken along the line 3—3 of FIG. 2.

DETAILED DESCRIPTION OF THE PREFERRED EMBODIMENT

Figure 2:
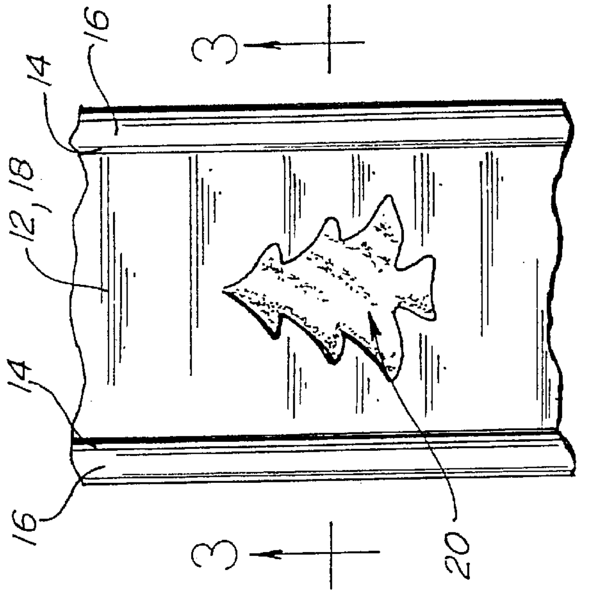
FIG. 2 Is a detail view of the front face and cutout for the Decorative Molding/Casing.
Figure 3:
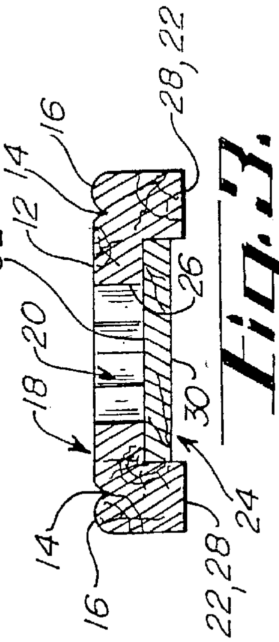
FIG. 3 is cross-sectional side view of the Decorative Molding/Casing taken along the line 3—3 of FIG. 2.
Figure 1:
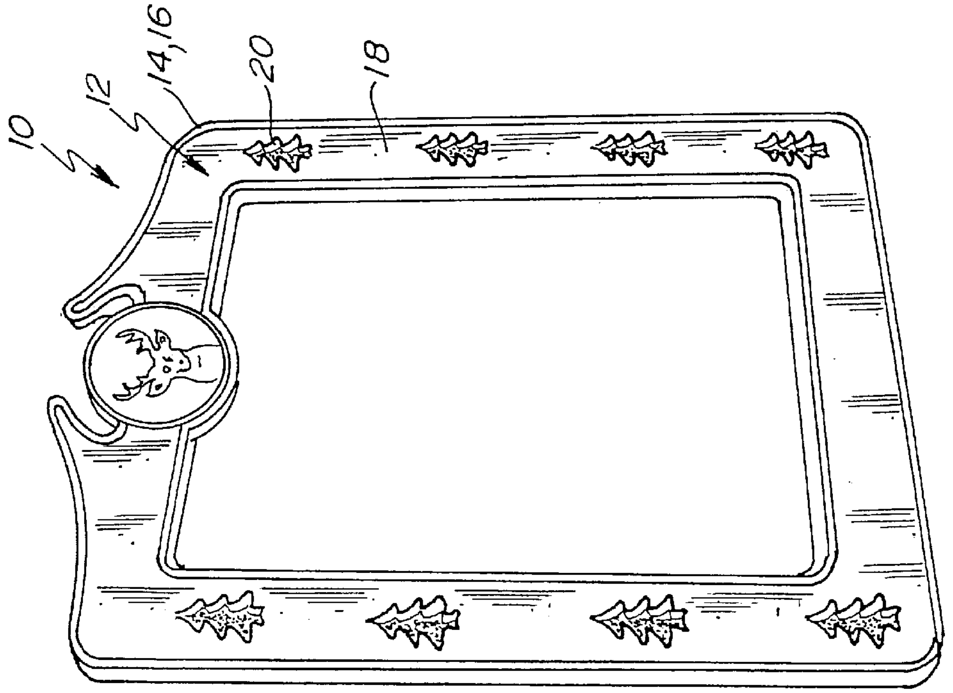
FIG. 1 is an environmental view of the Decorative Molding/Casing.

One embodiment of the decorative molding/casing is illustrated and described herein. In general, the decorative molding/casing is indicated by the numeral 10.

The decorative molding/casing 10 is preferably formed of wood, plastic, metal, tile, brass, aluminum, copper, Corian, Fountainhead, Surrell, Avonite, or any other material as preferred by an individual.

The decorative molding/casing 10 preferably includes a frame 11 having an exterior surface 12 which may include routed or lazered channels 14. The channels 14 may be cut in any desired combination to provide a grooved or curved exterior surface edge 16 for the decorative molding/casing 10. One or more channels 14 may be routed or lazered into the exterior surface 12 to create a desired artistic exterior surface edge 16. A plurality of channels 14 having varying depths may be routed or lazered into the exterior surface 12 to create a desired three dimensional artistic appearance for the exterior surface edge 16 and for the front face section 18. It should be noted that the combination of channels 14 are not required to establish a symmetrical front face section 18. Examples of unique and distinctive combinations of routed or lazered edges 14 are illustrated in FIGS. 5 through 29 herein. In addition the front face section 18 may include any combination of channels 14 as desired to provide a grooved or curved exterior surface.

One or a plurality of artistic cutouts 20 may be milled, routed or lazered through the front face section 18. The cutouts 20 may have any desired artistic shape as preferred by an individual including but not limited to Christmas trees, bear feet, human feet, deer tracks, raccoon tracks, animal or water fowl tracks, cactus shapes, bear cutouts, duck cutouts, leaf shapes, Aztec designs, cowboy hat designs, steer head shapes, cowboy boot shapes, pepper shapes, wolf tracks, and/or any other design as desired by an individual. It should be noted that the artistic design elements selected for the cutouts 20 may be routed or lazered through the decorative molding/casing 10 in either a horizontal or vertical orientation at the preference of an individual. It should be further noted that the artistic cutouts 20 routed or lazered within the front face section 18 may be repetitive or non-repetitive at the discretion of an individual.

Figure 4:
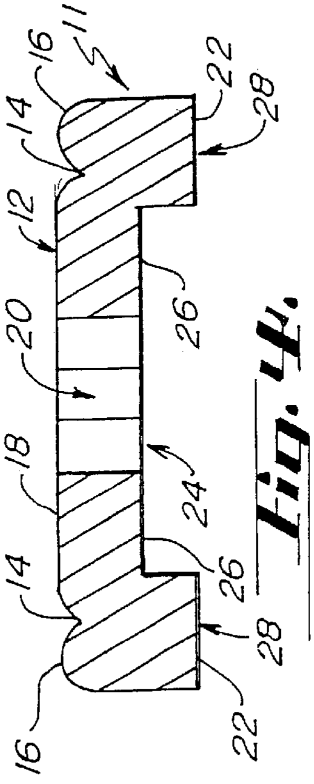
FIG. 4 is a detail partial cross-sectional side view of the Decorative Molding/Casing taken along the line 3—3 of FIG. 2.

The decorative molding/casing 10 also preferably includes a rear surface 22. A longitudinal groove 24 is preferably centrally milled within the rear surface 22 extending the length of the decorative molding/casing 10. The longitudinal groove 24 preferably has a relatively large relative width dimension and defines a first interior surface 26 and a pair of symmetric support sections 28. The longitudinal groove 24 preferably is sufficiently deep to receive the filler material 30 for flush or recessed alignment with respect to the rear surface 22. It should be noted that in FIGS. 5 through 29 that the longitudinal groove 24 is preferably sufficiently deep to receive the filler material 30 for flush or recessed alignment to the rear surface 22 or support section 28 and that the longitudinal groove 24 has the properties and configuration as more closely depicted in FIG. 4.

A filler material 30 having a colored surface 32 is preferably positioned within the longitudinal groove 24 and is further preferably secured to the first interior surface 26 through the use of glue, tacks, nails, and/or any other preferred securing means provided that the essential functions, features, and attributes described herein are not sacrificed. It should be noted that the colored surface 32 is positioned proximate to the first interior surface 26 such that the colored surface 32 is visible through the artistic cutouts 20 during use of the decorative molding/casing 10. It should be noted that the colored surface 32 then functions as an accent or highlight for the selected artistic design elements for the cutouts 20.

The material selected for the decorative molding/casing 10 may be plastic, metal, wood, tile, brass, aluminum, copper, Corian, Fountainhead, Surrell, and/or Avonite material at the preference of an individual. The filler material 30 may be formed of plywood, presswood, filler board, plastic, metal, and/or tile as painted or colored in any desired combination to complement the color selected for an interior decor of a room space to be decorated.

Figure 5:
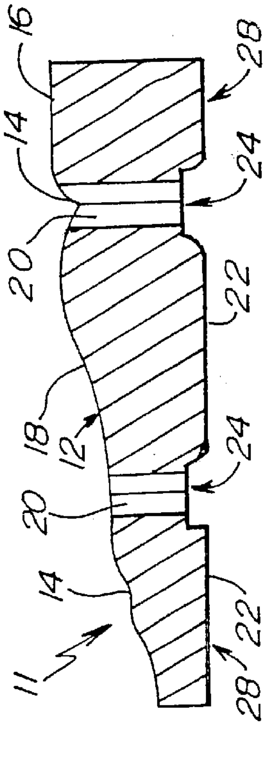
FIG. 5 is an alternative detail partial cross-sectional side view of the Decorative Molding/Casing taken along the line 3—3 of FIG. 2.
Figure 6:
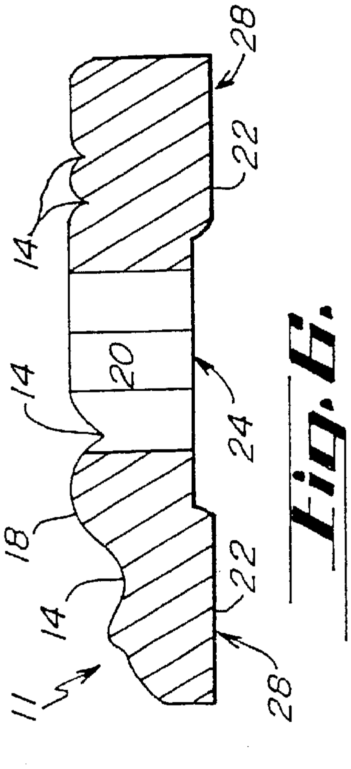
FIG. 6 is an alternative detail partial cross-sectional side view of the Decorative Molding/Casing taken along the line 3—3 of FIG. 2.
Figure 7:
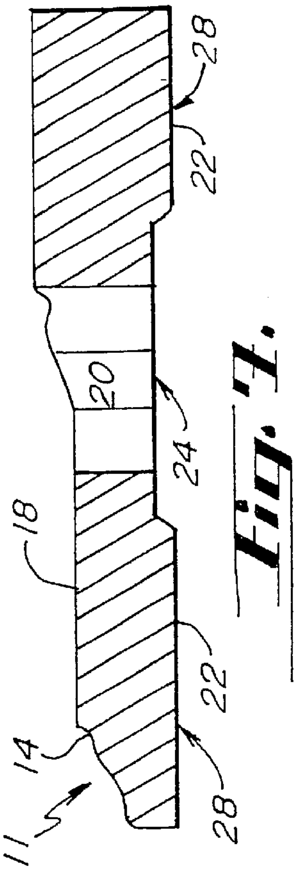
FIG. 7 is an alternative detail partial cross-sectional side view of the Decorative Molding/Casing taken along the line 3—3 of FIG. 2.
Figure 8:
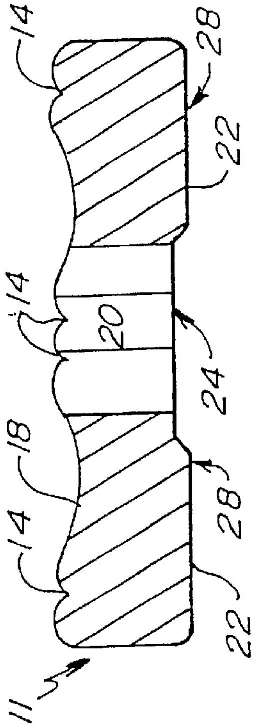
FIG. 8 is an alternative detail partial cross-sectional side view of the Decorative Molding/Casing taken along the line 3—3 of FIG. 2.
Figure 9:
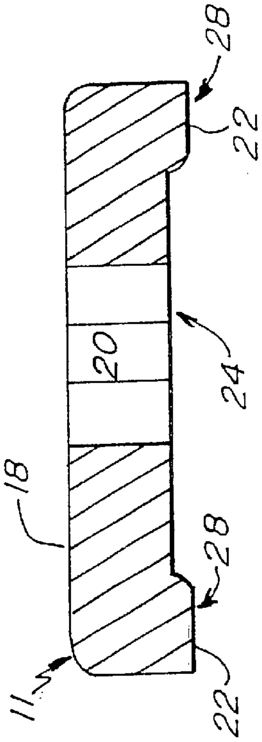
FIG. 9 is an alternative detail partial cross-sectional side view of the Decorative Molding/Casing taken along the line 3—3 of FIG. 2.
Figure 16:
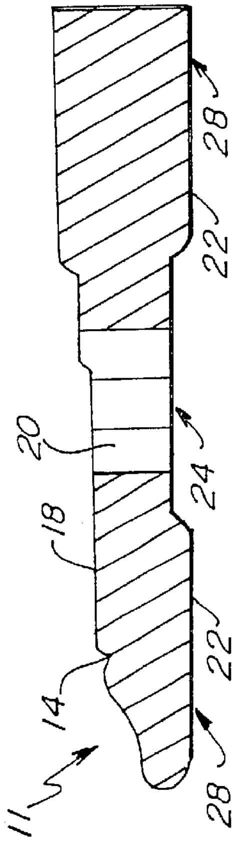
FIG. 16 is an alternative detail partial cross-sectional side view of the Decorative Molding/Casing taken along the line 3—3 of FIG. 2.
Figure 18:
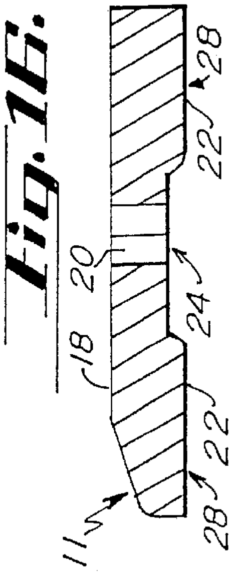
FIG. 18 is an alternative detail partial cross-sectional side view of the Decorative Molding/Casing taken along the line 3—3 of FIG. 2.
Figure 19:
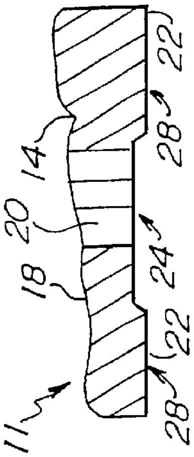
FIG. 19 is an alternative detail partial cross-sectional side view of the Decorative Molding/Casing taken along the line 3—3 of FIG. 2.
Figure 20:
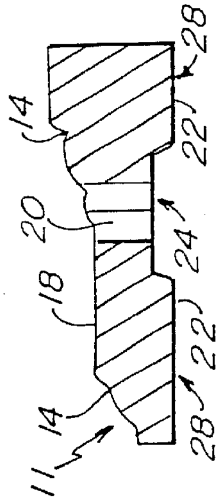
FIG. 20 is an alternative detail partial cross-sectional side view of the Decorative Molding/Casing taken along the line 3—3 of FIG. 2.
Figure 21:
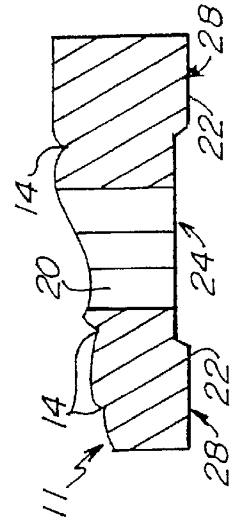
FIG. 21 is an alternative detail partial cross-sectional side view of the Decorative Molding/Casing taken along the line 3—3 of FIG. 2.
Figure 22:
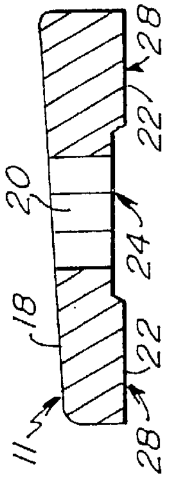
FIG. 22 is an alternative detail partial cross-sectional side view of the Decorative Molding/Casing taken along the line 3—3 of FIG. 2.
Figure 23:
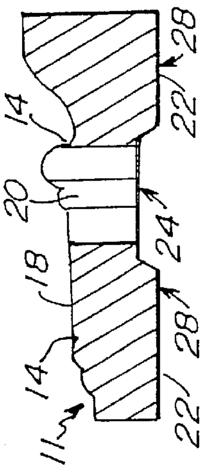
FIG. 23 is an alternative detail partial cross-sectional side view of the Decorative Molding/Casing taken along the line 3—3 of FIG. 2.
Figure 24:
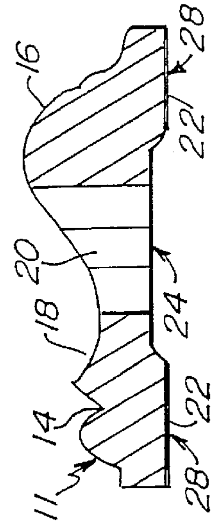
FIG. 24 is an alternative detail partial cross-sectional side view of the Decorative Molding/Casing taken along the line 3—3 of FIG. 2.
Figure 25:
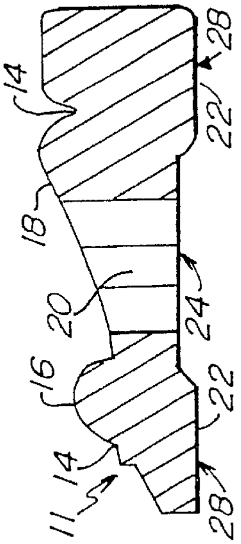
FIG. 25 is an alternative detail partial cross-sectional side view of the Decorative Molding/Casing taken along the line 3—3 of FIG. 2.
Figure 26:
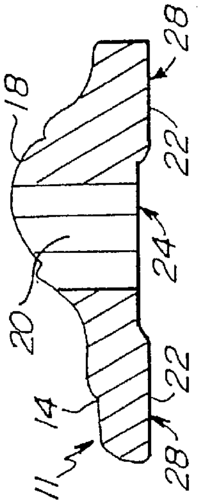
FIG. 26 is an alternative detail partial cross-sectional side view of the Decorative Molding/Casing taken along the line 3—3 of FIG. 2.
Figure 27:
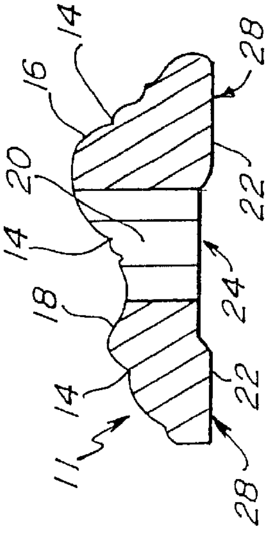
FIG. 27 is an alternative detail partial cross-sectional side view of the Decorative Molding/Casing taken along the line 3—3 of FIG. 2.
Figure 28:
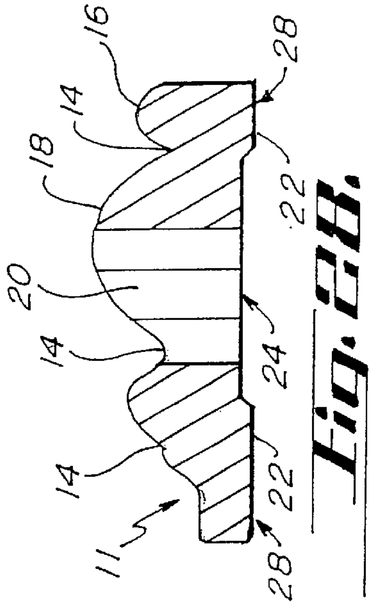
FIG. 28 is an alternative detail partial cross-sectional side view of the Decorative Molding/Casing taken along the line 3—3 of FIG. 2.
Figure 29:
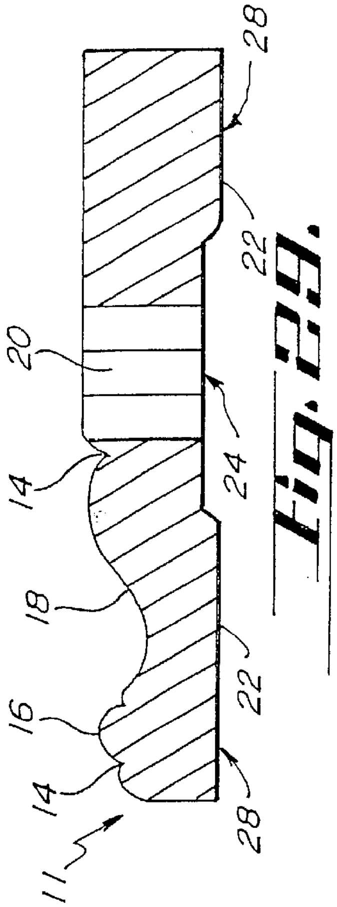
FIG. 29 is an alternative detail partial cross-sectional side view of the Decorative Molding/Casing taken along the line 3—3 of FIG. 2.

Referring to FIG. 5 the decorative molding/casing 10 has more than one longitudinal groove 24 in the rear surface 22. In addition the front face 18 has more than one row or column of aligned cutouts 20 used to provide a desired type of artistic appearance for the decorative molding/casing 10. It should be noted that any number of longitudinal groves 24 may be placed into the rear surface 22 and that any number of rows or columns of cutouts 20 may be selected as desired by an individual for the decorative molding/casing 10 illustrated and described herein.

Referring to FIG. 13, the front face 18 may have one or more channels 34 at the discretion of an individual.

The decorative molding/casing 10 preferably has dimensions of 3¼ inches in width and ¾ inch thickness and may be formed in any length as desired by an individual. The preferred dimensions for the longitudinal groove 24 are preferably 2 inches in width and ⅜ inch in depth extending the length of the decorative molding/casing 10. Each support section 28 preferably has a width dimension of 5/16 inch and a depth dimension of approximately ⅜ inch as preferred by an individual.

In an alternative embodiment the decorative molding/casing 10 may be formed of a frame 11 having an exterior surface 12 and a rear surface 22. The exterior surface 12 may have channels 14 in any desired combination to form an artistic front face section 18. In the alternative embodiment the rear surface 22 does not include a longitudinal groove 24 and is substantially flat. At least one cutout 20 preferably traverses the front face section 18 or exterior surface 12 passing through the rear surface 22. A filler material 30 having a colored surface 32 may then be secured or affixed to the rear surface 22 positioning the colored surface 32 proximate to the cutout 20 and to the exterior surface 12 for observation by an individual to create a desired decorative effect.

The decorative molding/casing 10 is preferably manufactured through the use of a CNC machine having the ability to provide router cuts, slots, grooves, and/or channels 14. The molding/casing may also be manufactured through use of a 4 inches by 9 inches—six head superset molder. A 5 feet by 8 feet Komo CNC router may also be utilized having an automatic tool changer and 17 spiral boring heads with vertical and horizontal positioning. Further, a wood welder forty-two may be utilized which includes a radio frequency gluing machine for securing the filler material 30 within the longitudinal groove 24. Lazer cutting may alternatively occur through the use of a Lazer Graze SE 2300 having a three feet by three feet table.

The first step to manufacture the decorative molding/casing 10 is to select a frame or stock molding or casing material and then to route or lazer any desired edges, grooves, or channels 14 on the exterior surface 12 while simultaneously forming the front face section 18.

The second step is to mill a longitudinal groove 24 into the rear surface 22 of the routed or lazered molding or casing material to establish a pair of symmetric support sections 28 and a first interior surface 26.

The third step for manufacture of the decorative molding/casing 10 is to route or lazer any desired artistic cutouts 20 through the front face section 18 and into the longitudinal groove 24 which naturally traverse the first interior surface 26.

The fourth step is to color or select a pre-colored filler material 30 having a colored surface 32 and then cutting the filler material 30 to the size dimensions selected for the longitudinal groove 24.

The fifth step in forming the decorative molding/casing 10 is to apply an adhesive or other fastener to the colored surface 32 of the filler material 30 proximate to the edges of the filler material 30.

The sixth step is to position the filler material 30 with the colored surface 32 adjacent to the first interior surface 26 within the longitudinal groove 24.

The seventh step in manufacture of the decorative molding/casing 10 is to secure the colored surface 32 to the first interior surface 26 through the use of the adhesive or other fastener whereby the colored surface 32 is visible through the cutouts 20 traversing the front face section 18 to highlight the selected artistic design for the decorative molding/casing 10.

The eighth step is to use the decorative molding/casing 10 as a decorative accent feature within a room, upon furniture, as a picture or door frame, or to use the decorative molding/casing for another application as desired by an individual. It should be noted that the second step may be eliminated at the discretion of an individual.

It should be noted that the method steps identified herein may be modified to accommodate differing materials such as metal, plastic, and/or tile which may eliminate the necessity for individual manufacturing steps or alternatively may require the inclusion of additional or substitute manufacturing steps to create the decorative molding/casing 10.

It should also be noted that plastic, metal, and/or tile utilized to form the decorative molding/casing 10 may be applied adjacent to sinks, bathrooms, bath tubs, and/or vanities at the discretion of an individual.

The decorative molding/casing 10 illustrated and described herein may be utilized in an unlimited number of applications as conceived by an individual.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

I claim:

1. A decorative molding/casing comprising:

a) a non-metallic frame having edges, a rear surface and grooves in the frame defining a front face section;

b) a longitudinal groove in the rear surface defining a pair of support sections and a first interior surface;

c) an artistic design cutout through the front face section establishing at least one opening through the first interior surface and into the longitudinal groove;

d) a non-plastic colored filler material having a colored surface positioned within the longitudinal groove, the colored surface being in contact with the first interior surface, the filler material not filling the cutout; and e) a fastener constructed and arranged to secure the filler material within the longitudinal groove whereby the colored surface is visible through the cutout traversing the front face section to highlight the cutout and the decorative molding/casing.

2. The decorative molding/casing according to claim 1, wherein the groves are positioned proximate to the edges of the frame.

3. The decorative molding/casing according to claim 1, wherein the longitudinal grooves define support sections, said support sections being substantially symmetrical.

4. The decorative molding/casing according to claim 1, wherein the front face section is substantially flat.

5. The decorative molding/casing according to claim 1, the front face section comprising a plurality of cutouts.

6. The decorative molding/casing according to claim 1, the fastener comprising an adhesive.

7. The decorative molding/casing according claim 1, the fastener comprising nails.

8. A decorative molding/casing comprising:

a) a non-metallic frame having an exterior surface and a rear surface, said rear surface comprising a longitudinal groove defining a pair of support sections;

b) at least one artistic design cutout through the exterior surface and the rear surface, said at least one cutout defining at least one opening through the frame;

c) a non-plastic filler material having a colored surface positioned within the longitudinal groove and proximate to the rear surface, the filler material not filling the at least one cutout; and d) a fastener constructed and arranged to secure the filler material to the rear surface whereby the colored surface is visible through the at least one cutout to highlight the at least one cutout and the decorative molding/casing.

9. A decorative molding/casing comprising:

a) a non-metallic frame having edges, an exterior surface, a rear surface, grooves in the frame defining a front face section, and at least one cutout traversing the exterior surface and the rear surface;

b) a longitudinal groove in the rear surface defining a pair of support sections and a first interior surface; and c) a non-plastic filler material having a colored surface positioned within said longitudinal groove, the colored surface being in contact with the first interior surface, the filler material being secured to said first interior surface, said colored surface positioned proximate to said cutout whereby the colored surface is visible through the cutout to highlight the cutout and the decorative molding/casing.

10. The decorative molding/casing according to claim 9, wherein said longitudinal groove defines a pair of support sections, said cutouts traversing said exterior surface into said longitudinal groove.

11. The decorative molding/casing according to claim 10, said exterior surface comprising at least one channel, an edge, and a substantially flat front face section.

12. The decorative molding/casing according to claim 11, wherein said channel is positioned proximate to said edge of said exterior surface.

13. The decorative molding/casing according to claim 12, wherein said support sections are substantially symmetrical.

14. The decorative molding/casing according to claim 13, wherein said filler is in flush alignment with said support sections.

15. The decorative molding/casing according to claim 13, wherein said filler material is recessed with respect to said support sections.

16. The decorative molding/casing according to claim 5, further comprising a plurality of regularly spaced cutouts along the front face section.

* * * * *